US012043241B2

(12) United States Patent
Follen et al.

(10) Patent No.: US 12,043,241 B2
(45) Date of Patent: *Jul. 23, 2024

(54) SYSTEMS AND METHODS OF ENERGY MANAGEMENT AND CONTROL OF VEHICLE ACCESSORIES

(71) Applicant: CUMMINS INC., Columbus, IN (US)

(72) Inventors: Kenneth M. Follen, Greenwood, IN (US); Arun Prakash Thunga Gopal, Columbus, IN (US); Archit N. Koti, Columbus, IN (US); Mugdha S. Sane, Columbus, IN (US); Vivek A. Sujan, Columbus, IN (US); Pinak Jayant Tulpule, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,671

(22) Filed: May 9, 2022

(65) Prior Publication Data
US 2022/0258716 A1 Aug. 18, 2022

Related U.S. Application Data

(63) Continuation of application No. 16/895,723, filed on Jun. 8, 2020, now Pat. No. 11,325,578, which is a
(Continued)

(51) Int. Cl.
B60W 10/30 (2006.01)
B60H 1/00 (2006.01)
(Continued)

(52) U.S. Cl.
CPC ......... B60W 10/30 (2013.01); B60H 1/00428 (2013.01); B60H 1/00764 (2013.01);
(Continued)

(58) Field of Classification Search
CPC ...... B60W 10/30; B60W 20/12; B60W 20/14; B60W 10/06; B60W 10/08; B60W 20/00;
(Continued)

(56) References Cited

U.S. PATENT DOCUMENTS 5,924,406 A 7/1999 Kinugasa et al.
6,434,510 B1 * 8/2002 Callaghan .............. G01C 22/02
702/116
(Continued)

FOREIGN PATENT DOCUMENTS

CN 1167873 A 12/1997
CN 102445927 5/2012
(Continued)

OTHER PUBLICATIONS

Extended European Search Report for European Application No. 16873941.5, dated Jun. 24, 2019, 10 pages.
(Continued)

Primary Examiner — Gertrude Arthur Jeanglaude
(74) Attorney, Agent, or Firm — FOLEY & LARDNER LLP

(57) ABSTRACT

Systems, apparatuses, and methods disclosed herein relate to a system including a vehicle accessory and a controller coupled to the vehicle accessory. The controller is configured to receive internal vehicle information including information about the vehicle accessory; receive external static information based on a position of the vehicle; receive external dynamic information based on the position and a time of travel of the vehicle at the position; and control operation of the vehicle accessory based on the internal vehicle information, the external static information, and the external dynamic information.

19 Claims, 4 Drawing Sheets

Related U.S. Application Data continuation of application No. 15/781,672, filed as application No. PCT/US2016/065883 on Dec. 9, 2016, now Pat. No. 10,676,077.

(60) Provisional application No. 62/265,689, filed on Dec. 10, 2015.

(51) Int. Cl.
| | |
|---|---|
| *B60L 1/00* | (2006.01) |
| *B60L 1/02* | (2006.01) |
| *B60L 7/10* | (2006.01) |
| *B60W 10/06* | (2006.01) |
| *B60W 10/08* | (2006.01) |
| *B60W 20/00* | (2016.01) |
| *B60W 20/12* | (2016.01) |
| *B60W 20/14* | (2016.01) |
| *B60W 30/18* | (2012.01) |
| *B60W 30/188* | (2012.01) |
| *B60W 50/00* | (2006.01) |
| *B60K 6/20* | (2007.10) |

(52) U.S. Cl.
CPC .............. *B60L 1/003* (2013.01); *B60L 1/02* (2013.01); *B60L 7/10* (2013.01); *B60W 10/06* (2013.01); *B60W 10/08* (2013.01); *B60W 20/00* (2013.01); *B60W 20/12* (2016.01); *B60W 20/14* (2016.01); *B60W 30/18127* (2013.01); *B60W 30/1886* (2013.01); *B60W 50/0097* (2013.01); *B60K 6/20* (2013.01); *B60L 2240/34* (2013.01); *B60L 2240/642* (2013.01); *B60L 2240/662* (2013.01); *B60L 2240/68* (2013.01); *B60W 2552/15* (2020.02); *B60W 2552/20* (2020.02); *B60W 2555/20* (2020.02); *B60W 2555/60* (2020.02); *B60W 2556/50* (2020.02); *B60W 2710/0688* (2013.01); *B60W 2710/305* (2013.01); *B60Y 2200/92* (2013.01); *B60Y 2300/51* (2013.01); *Y02T 10/72* (2013.01); *Y02T 90/16* (2013.01); *Y10S 903/93* (2013.01)

(58) Field of Classification Search
CPC ....... B60W 30/18127; B60W 30/1886; B60W 50/0097; B60W 2556/50; B60W 2552/20; B60W 2555/20; B60W 2555/60; B60W 2552/15; B60W 2710/0688; B60W 2710/305; B60H 1/00428; B60H 1/00764; B60L 1/003; B60L 1/02; B60L 7/10; B60L 2240/34; B60L 2240/642; B60L 2240/662; B60L 2240/68; B60K 5/20; B60Y 2200/92; B60Y 2300/51; Y02T 10/72; Y02T 90/16; Y10S 903/93
See application file for complete search history.

(56) References Cited

U.S. PATENT DOCUMENTS

| | | | |
|---|---|---|---|
| 6,745,585 B2 | 6/2004 | Kelm et al. | |
| 7,032,393 B2 | 4/2006 | Tamai et al. | |
| 7,143,596 B2 | 12/2006 | Yonekura et al. | |
| 7,665,559 B2 | 2/2010 | De La Torre-Bueno | |
| 7,958,958 B2 | 6/2011 | De La Torre Bueno | |
| 8,036,785 B2 | 10/2011 | Maguire et al. | |
| 8,204,640 B2 | 6/2012 | Tani et al. | |
| 8,340,849 B2 | 12/2012 | Amano et al. | |
| 8,370,012 B2 | 2/2013 | Yamada et al. | |
| 8,374,740 B2 | 2/2013 | Druenert et al. | |
| 8,401,733 B2 | 3/2013 | Weslati et al. | |
| 8,515,607 B2 | 8/2013 | Amano et al. | |
| 8,560,155 B2 | 10/2013 | Kedar-Dongarkar | |
| 8,612,082 B2 | 12/2013 | Hashimoto et al. | |
| 8,613,333 B2 | 12/2013 | Janczak et al. | |
| 8,688,302 B2 | 4/2014 | Sujan et al. | |
| 8,751,083 B2 | 6/2014 | Huntzicker | |
| 8,751,087 B1 | 6/2014 | Dufford | |
| 8,761,981 B2 | 6/2014 | Hussain et al. | |
| 8,839,890 B2 | 9/2014 | Caruso et al. | |
| 8,973,690 B2 | 3/2015 | Yates et al. | |
| 9,043,106 B2 | 5/2015 | Ingram et al. | |
| 9,058,038 B2 | 6/2015 | Zhang et al. | |
| 10,676,077 B2 | 6/2020 | Follen et al. | |
| 11,325,578 B2* | 5/2022 | Follen ................... | B60W 10/30 |
| 2005/0280524 A1* | 12/2005 | Boone ................... | G09F 21/049 |
| | | | 340/461 |
| 2007/0208500 A1 | 9/2007 | Sommariva et al. | |
| 2011/0246010 A1 | 10/2011 | De La Torre Bueno | |
| 2012/0010767 A1 | 1/2012 | Phillips et al. | |
| 2012/0310471 A1 | 12/2012 | Sengoku et al. | |
| 2013/0058801 A1 | 3/2013 | Cheng et al. | |
| 2013/0131892 A1 | 5/2013 | Hashimoto et al. | |
| 2013/0151044 A1 | 6/2013 | Lee | |
| 2013/0158762 A1 | 6/2013 | An et al. | |
| 2013/0274952 A1 | 10/2013 | Weslati et al. | |
| 2014/0088855 A1 | 3/2014 | Ferguson | |
| 2014/0139354 A1 | 5/2014 | Miyazaki | |
| 2014/0232356 A1 | 8/2014 | Kyoung | |
| 2014/0358367 A1 | 12/2014 | Copeland et al. | |
| 2015/0027837 A1 | 1/2015 | Lamba | |
| 2015/0032310 A1 | 1/2015 | Zettel et al. | |
| 2015/0066837 A1 | 3/2015 | Twarog et al. | |
| 2015/0073639 A1 | 3/2015 | Minarcin et al. | |
| 2015/0081202 A1 | 3/2015 | Levin | |
| 2015/0151736 A1 | 6/2015 | Kim | |
| 2015/0165916 A1 | 6/2015 | Kim et al. | |
| 2015/0175020 A1 | 6/2015 | Kim et al. | |
| 2015/0275787 A1 | 10/2015 | Dufford et al. | |
| 2015/0275788 A1 | 10/2015 | Dufford et al. | |
| 2015/0336458 A1 | 11/2015 | Lee et al. | |
| 2016/0031339 A1 | 2/2016 | Geo | |
| 2016/0046278 A1 | 2/2016 | Matsuzaki et al. | |
| 2016/0052420 A1 | 2/2016 | Kim | |
| 2016/0107634 A1 | 4/2016 | Kim et al. | |
| 2016/0114787 A1 | 4/2016 | Yang et al. | |
| 2016/0129918 A1 | 5/2016 | Skaff et al. | |

FOREIGN PATENT DOCUMENTS

| | | |
|---|---|---|
| CN | 103758622 A | 4/2014 |
| CN | 104924872 A | 9/2015 |
| CN | 104955702 A | 9/2015 |
| DE | 10 2013 003 708 | 9/2014 |
| EP | 2 626 258 A1 | 8/2013 |
| JP | 2012-085505 | 4/2012 |
| WO | WO-2011/124800 | 10/2011 |
| WO | WO-2015/089650 A1 | 6/2015 |

OTHER PUBLICATIONS

Foreign Action other than Search Report on CN 2016800722255, dated Jan. 19, 2021.
International Search Report and Written Opinion for International Application No. PCT/US2016/065883, dated Feb. 17, 2017, 7 pages.
Non-Final Office Action for U.S. Appl. No. 16/895,723, dated Sep. 8, 2021.
Notice of Allowance for U.S. Appl. No. 16/895,723, dated Jan. 12, 2022.
CN First Office Action for Application No. 202111305309.8 mailing date Apr. 6, 2023, 11 pages with English translation.

* cited by examiner

SYSTEMS AND METHODS OF ENERGY MANAGEMENT AND CONTROL OF VEHICLE ACCESSORIES

CROSS-REFERENCE TO RELATED PATENT APPLICATIONS

This application is a continuation of U.S. patent application Ser. No. 16/895,723, filed on Jun. 8, 2020, which is a continuation of U.S. patent application Ser. No. 15/781,672, filed on Jun. 5, 2018, now U.S. Pat. No. 10,676,077, which is a national stage application of International Patent Application No. PCT/US2016/065883, filed on Dec. 9, 2016, which claims the benefit of and priority to U.S. Provisional Patent Application No. 62/265,689, filed Dec. 10, 2015, all of which are incorporated herein by reference in their entireties.

TECHNICAL FIELD

The present disclosure relates to control strategies of electronic accessories for a vehicle. More particularly, the present disclosure relates to control strategies to the power supply for the electronic accessories.

BACKGROUND

In a vehicle, the battery or other power system of the vehicle provides a power supply to various electronic accessories. The accessories may include, for example, accessories relating to engine performance, safety features, comfort features, and any other type of vehicle subsystem. Various conditions may impact the ability of the power system of the vehicle to deliver power to the accessories. For example, external conditions such as the driving environment around the vehicle may impact vehicle performance. Conditions such as the road the vehicle is driving on, the speed limit on the road, the traffic around the vehicle, and the weather may impact the power system, as the power required to operate the accessories in the conditions may vary. For example, when traveling uphill or in heavy traffic conditions, more power may be required to be focused on more critical vehicle subsystems, rather than systems like the HVAC unit. Further, there may be some conditions in which one or more accessories or subsystems may be able to advantageously produce an energy supply for the power system.

SUMMARY

One embodiment relates to an apparatus. The apparatus includes an internal information module structured to receive internal information regarding operation of a vehicle, wherein the internal information includes information about one or more electronic accessories of the vehicle. The apparatus further includes an external static information module structured to obtain external static information for a route of the vehicle, wherein the external static information is based on a position of the vehicle on the route. The apparatus further includes an external dynamic information module structured to receive external dynamic information for the route of the vehicle, wherein the external dynamic information is based on the position and a time of travel of the vehicle at the position. The apparatus further includes a battery module structured to manage a power supply for the one or more electronic accessories based on the energy usage of the one or more electronic accessories. The apparatus further includes an accessory management module structured to control the operation of the one or more electronic accessories based on the internal information, external static information, and external dynamic information. According to one embodiment, the vehicle is a hybrid vehicle, whereby the hybrid vehicle may be an on-highway or off-highway (e.g., mining equipment) vehicle.

Another embodiment relates to a method. The method includes receiving, by a controller of a vehicle, internal vehicle information, the internal information including information about one or more electronic accessories of the vehicle. The method further includes receiving, by the controller, external static information, the external static information based on a position of the vehicle. The method further includes receiving, by the controller, external dynamic information, the external dynamic information based on the position and a time of travel of the vehicle at the position. The method further includes controlling, by the controller, the operation of the one or more electronic accessories of the vehicle based on the internal vehicle information, external static information, and external dynamic information. The method further includes managing, by the controller, a power supply for the one or more electronic accessories based on the energy usage of the one or more electronic accessories and the operation of the one or more electronic accessories.

Still another embodiment relates to a system. The system includes a battery system structured to store energy to be used to power one or more electronic accessories of a vehicle. The system further includes a controller operatively and communicably coupled to the battery system. The controller is structured to receive internal vehicle information, external static information, and external dynamic information. The controller is further structured to control the operation of the one or more electronic accessories based on the internal vehicle information, external static information, and external dynamic information. The controller is further structured to manage the battery system based on the energy usage of the one or more electronic accessories and the operation of the one or more electronic accessories.

These and other features, together with the organization and manner of operation thereof, will become apparent from the following detailed description when taken in conjunction with the accompanying drawings.

DETAILED DESCRIPTION

Figure 1:
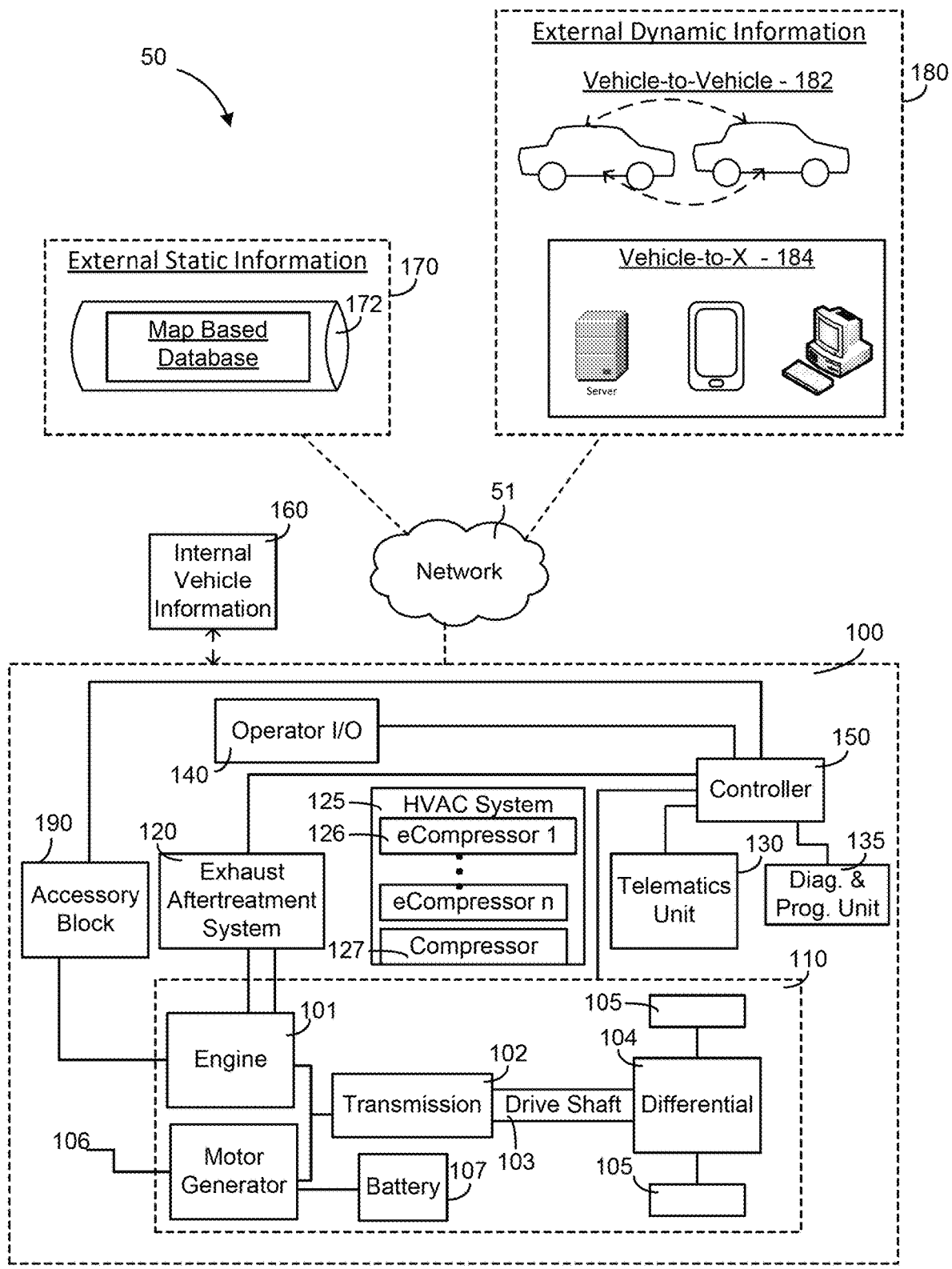
FIG. 1 is a schematic diagram of an intelligent transportation system, according to an example embodiment.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the disclosure as illustrated therein as would normally occur to one skilled in the art to which the disclosure relates are contemplated herein.

Referring to the Figures generally, the various embodiments herein relate to systems and methods of managing and controlling various electronic accessories in a hybrid vehicle. More particularly, the various embodiments herein relate to managing and controlling energy usage in the various electronic accessories. According to the present disclosure, a controller may be communicably coupled with one or more external data providing sources (e.g., a telematics system provider, another vehicle via a Vehicle-to-Vehicle network, a Vehicle-to-X network, etc.), such that the controller may receive data and have a knowledge of one or more upcoming conditions for the vehicle. Based on these conditions and internal information about the accessories, the controller may determine power-based settings for the various accessories. For example, the controller may receive data indicative of an upcoming hill and, in response, determine the power necessary to traverse the hill. The controller may then pre-charge the air compressor in response to the expected incline in the road grade. The controller may also pre-cool or pre-heat the cabin of the hybrid vehicle via a HVAC system, or pre-cool or pre-heat the engine or engine coolant via the engine fan.

As another example, the controller may receive data indicative of heavy traffic conditions and in response determine the conditions necessary for optimal braking. The controller may recharge the air compressor to allow sufficient air for braking maneuvers and to avoid compressor cycling in traffic. As yet another example, the controller may receive weather data and in response adjust the engine fan or HVAC system to account for the weather conditions (i.e., to adjust the HVAC system in response to the outside temperature, to adjust the engine fan to account for heat rejection capabilities, etc.). As yet another example, the controller may receive data indicative of an upcoming speed limit. In response to a reduced speed limit, the hybrid vehicle may slow down, and therefore free kinetic energy from the slowdown may be used to charge the air compressor (e.g., from regenerative braking). Advantageously, the various conditions may be used by the controller to more efficiently provide power to and improve operation of the various electronic accessories of the hybrid vehicle.

Referring now generally to FIG. 1, a schematic diagram of an intelligent transportation system is shown according to one embodiment. The intelligent transportation system (ITS) 50 is structured to provide an environment that facilitates and allows the exchange of information or data (e.g., communications) between a vehicle, such as vehicle 100, and one or more other components or sources. In this regard and for example, the ITS 50 may include telematics systems that facilitate the acquisition and transmission of data acquired regarding the operation of the vehicle 100. As shown and generally speaking, the ITS 50 includes a vehicle 100 communicably coupled via a network 51 to each of an external static information source 170 and an external dynamic information source 180, where the term "external" refers to a component or system outside of the vehicle 100. The information may be stored inside or outside of the vehicle 100.

The network 51 may be any type of communication protocol that facilitates the exchange of information between and among the vehicle 100 and the external static and dynamic information sources 170 and 180. In this regard, the network 51 may communicably couple the vehicle 100 with each of the external static and dynamic information sources 170 and 180. In one embodiment, the network 51 may be configured as a wireless network. In this regard, the vehicle 100 may wirelessly transmit and receive data from at least one of the external static and dynamic information sources 170 and 180. The wireless network may be any type of wireless network, such as Wi-Fi, WiMax, Geographical Information System (GIS), Internet, Radio, Bluetooth, Zigbee, satellite, radio, Cellular, Global System for Mobile Communications (GSM), General Packet Radio Service (GPRS), Long Term Evolution (LTE), light signaling, etc. In an alternate embodiment, the network 51 may be configured as a wired network or a combination of wired and wireless protocol. For example, the controller 150 and/or telematics unit 130 of the vehicle 100 may electrically, communicably, and/or operatively couple via fiber optic cable to the network 51 to selectively transmit and receive data wirelessly to and from at least one of the external static and dynamic information sources 170 and 180.

The external static information source 170 may be any information (e.g., data, value, etc.) provider capable of providing external static information, where external static information refers to information or data that may vary as a function of position (e.g., the grade of the road may vary along a route) but is substantially unchanging with respect to time. In this regard, the external static information source 170 may include one or more map based databases 172, where the map based database 172 includes static information including, but not limited to, road grade data (e.g., the road grade at various spots along various routes), speed limit data (e.g., posted speed limits in various road locations), elevation or altitude data at various points along a route, curvature data at various points along a route, location of intersections along a route, etc. It should be understood that the present disclosure contemplates other sources of external static information (e.g., a global positioning system satellite that provides latitude, longitude, and/or elevation data), such that the database configuration is not meant to be limiting or intended to be the only type of static information source contemplated.

The external dynamic information source 180 may be any external dynamic information (e.g., data, value, etc.) provider, where external dynamic information refers to information or data that may vary as a function of both time and location (e.g., construction speed limits). In this regard, the external dynamic information source 180 may include any source capable of providing the external dynamic information. Accordingly, the external dynamic information source 180 may include vehicle-to-vehicle 182 communications. In this regard, the vehicle 100 may communicate with one or more other vehicles directly (e.g., via NFC, etc.) to obtain data regarding one or more upcoming conditions for the vehicle 100. In another embodiment, the external dynamic information source 182 may include a vehicle-to-X 184 configuration, where the "X" refers to any remote information providing source. For example and as shown in FIG. 1, the remote information providing source may include one or more servers, computers, mobile devices, infrastructure components, etc. Accordingly, the external dynamic information may include, but is not limited to, a traffic density at a particular location at a particular time, a weather condition at a particular location at a particular time, etc. Like the external static information sources 170, it should be understood that the present disclosure contemplates other sources of external dynamic information sources, such that the depicted examples are not meant to be limiting or intended to be the only type of dynamic information source contemplated.

Referring now to the vehicle 100 of FIG. 1, the vehicle 100 is communicably coupled with each of the external static and dynamic sources 170, 180 via the network 51. In the embodiment depicted, the vehicle 100 is structured as a hybrid vehicle having an internal combustion engine 101 power source and a motor/generator 106 power source. The vehicle 100 may be configured as any type of hybrid-powered vehicle (e.g., a full electric vehicle, a plug-in hybrid vehicle, etc.). As such, the vehicle 100 may be configured as an on-road or an off-road vehicle including, but not limited to, line-haul trucks, mid-range trucks (e.g., pick-up truck), tanks, airplanes, off-highway equipment such as mining equipment, etc. Before delving into the particulars of the ITS 50 in regard to the vehicle 100, the various components of the vehicle 100 may be described as follows. The vehicle 100 is shown to generally include a powertrain system 110, an exhaust aftertreatment system 120, a heating ventilation and air conditioning system 125, a telematics unit 130, a diagnostic and prognostic unit 135, an operator input/output (I/O) device 140, an accessory block 190, and a controller 150, where the controller 150 is communicably coupled to each of the aforementioned components.

The powertrain system 110 facilitates power transfer from the engine 101 and/or motor generator 106 to power and/or propel the vehicle 100. The powertrain system 110 includes an engine 101 and a motor generator 106 operably coupled to a transmission 102 that is operatively coupled to a drive shaft 103, which is operatively coupled to a differential 104, where the differential 104 transfers power output from the engine 101 and/or motor generator 106 to the final drive (shown as wheels 105) to propel the vehicle 100. In this regard, the powertrain system 110 is structured as an electrified powertrain. The electrified powertrain includes the motor generator 106, where the motor generator 106 may include a torque assist feature, a regenerative braking energy capture ability, a power generation ability, and any other feature of motor generators used in hybrid vehicles. In this regard, the motor generator 106 may be any conventional motor generator that is capable of generating electricity and producing a power output to drive the transmission 102. The motor generator 106 includes a power conditioning device such as an inverter and motor controller. The electrified powertrain may also include any one or more of several electrified accessories including, but not limited to, an electrically driven/controlled air compressor, an electrically driven/controlled engine cooling fan, an electrically driven/controlled heating venting and air conditioning system, an alternator, etc., where the controllability may stem from the controller 150. It should be understood that the present disclosure contemplates any and all other types of electrically-powered accessories that may be a part of the powertrain system 110 and/or separate from the powertrain system 110 but included in the vehicle 100.

As a brief overview, the engine 101 receives a chemical energy input (e.g., a fuel such as gasoline or diesel) and combusts the fuel to generate mechanical energy, in the form of a rotating crankshaft. In comparison, the motor generator 106 may be in a power receiving relationship with an energy source, such as battery 107 that provides an input energy (and stores generated electrical energy) to the motor generator 106 for the motor generator 106 to output in form of useable work or energy to in some instances propel the vehicle 100 alone or in combination with the engine 101. In this configuration, the hybrid vehicle 100 has a parallel drive configuration. However, it should be understood, that other configuration of the vehicle 100 are intended to fall within the spirit and scope of the present disclosure (e.g., a series configuration and non-hybrid applications, such as a full electric vehicle, etc.). As a result of the power output from at least one of the engine 101 and the motor generator 106, the transmission 102 may manipulate the speed of the rotating input shaft (e.g., the crankshaft) to effect a desired drive shaft 103 speed. The rotating drive shaft 103 is received by a differential 104, which provides the rotation energy of the drive shaft 103 to the final drive 105. The final drive 105 then propels or moves the vehicle 100.

The engine 101 may be structured as any internal combustion engine (e.g., compression-ignition or spark-ignition), such that it can be powered by any fuel type (e.g., diesel, ethanol, gasoline, etc.). Similarly, although termed a 'motor generator' 106 throughout the pages of the disclosure, thus implying its ability to operate as both a motor and a generator, it is contemplated that the motor generator component, in some embodiments, may be an electric generator separate from the electric motor of the hybrid vehicle 100. Furthermore, the transmission 102 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission can include a variety of settings (gears, for a geared transmission) that affect different output speeds based on the engine speed. Like the engine 101 and the transmission 102, the drive shaft 103, differential 104, and final drive 105 may be structured in any configuration dependent on the application (e.g., the final drive 105 is structured as wheels in an automotive application and a propeller in an airplane application). Further, the drive shaft 103 may be structured as a one-piece, two-piece, and a slip-in-tube driveshaft based on the application.

Moreover, the battery 107 may be configured as any type of rechargeable (i.e., primary) battery and of any size. That is to say, the battery 107 may be structured as any type of electrical energy storing and providing device, such as one or more capacitors (e.g., ultra capacitors, etc.) and/or one or more batteries typically used or that may be used in hybrid vehicles (e.g., Lithium-ion batteries, Nickel-Metal Hydride batteries, Lead-acid batteries, etc.). The battery 107 may be operatively and communicably coupled to the controller 150 to provide data indicative of one or more operating conditions or traits of the battery 107. The data may include a temperature of the battery, a current into or out of the battery, a number of charge-discharge cycles, a battery voltage, etc. As such, the battery 107 may include one or more sensors coupled to the battery 107 that acquire such data. In this regard, the sensors may include, but are not limited to, voltage sensors, current sensors, temperature sensors, etc.

As also shown, the vehicle 100 includes an exhaust aftertreatment system 120 in fluid communication with the engine 101. The exhaust aftertreatment system 120 receives the exhaust from the combustion process in the engine 101 and reduces the emissions from the engine 101 to less environmentally harmful emissions (e.g., reduce the NOx amount, reduce the emitted particulate matter amount, etc.). The exhaust aftertreatment system 120 may include any component used to reduce diesel exhaust emissions, such as a selective catalytic reduction catalyst, a diesel oxidation catalyst, a diesel particulate filter, a diesel exhaust fluid doser with a supply of diesel exhaust fluid, and a plurality of sensors for monitoring the system 120 (e.g., a NOx sensor). It should be understood that other embodiments may exclude an exhaust aftertreatment system and/or include different, less than, and/or additional components than that listed above. All such variations are intended to fall within the spirit and scope of the present disclosure.

The HVAC system 125 (also referred to herein as the HVAC unit) may be structured to control or manage a cabin temperature of the vehicle 100. The HVAC system 125 may include any component that may be included in an HVAC system for an on-road or off-road vehicle. In this regard, the HVAC system 125 may include, but is not limited to, piping/conduit for circulating coolant, a coolant reservoir, a cabin air filter, a condenser, an evaporator, various temperature, pressure, and fluid flow sensors, a thermostat, a pump, a compressor, a valve such as an expansion valve, a blower fan, etc. In the example depicted, the HVAC system 125 is shown to include at least one electric compressor 126 and a conventional compressor 127. Due to the presence of the at least one electric compressor 126, the HVAC system 125 may referred to as an "electrified HVAC system 125."

The conventional compressor 127 may be any conventional compressor that is driven from the engine 101 (e.g., rotary compressor, scroll compressor, variable displacement compressor, etc.). The conventional nature of the compressor 127 signifies that the compressor 127 is directly mechanically coupled to the engine 101, such as via a belt. In this regard, engine speed output is directly imputed/proportional to the compressor 127.

In contrast, the at least one electric compressor 126 is driven or powered by the battery 107. Additionally or alternatively, the motor generator 106 may provide power to the electric compressor 126. In either situation, the output (e.g., speed or power) from the electric compressor 126 may be independent of the output from the engine 101. As a result, the controller 150 may independently control the electric compressor 126 whereas the compressor 127 is directly controlled from the output/operation of the engine 101.

As shown, at least one electric compressor 126 is included in the HVAC system 125. As a result, multiple fluid circuits may be included with the HVAC system 125 to route coolant through each of the one or more electric compressors 126. While increasing the size of the electric compressor may decrease the number of components and potentially reduce the size footprint of the HVAC system, typically, the larger the compressor the worse the efficiency of that compressor. Thus, by including multiple electric compressors, the efficiency of each individual electric compressor may be relatively high.

Advantageously, the electrified HVAC system may enable the decoupling of engine speed and compressor speed to thereby lead to higher efficiency of the conventional and electric compressors. Further, engineers may select more "right sized" conventional and electric compressors due to better control of the conventional and electric compressor speed and cooling capacities. As a result, higher efficiency of the electrified HVAC system 125 may result than that of traditional, conventional HVAC systems.

Beneficially and as described herein, the controller 150 may selectively activate or deactivate each of the one or more electric compressors 126 (in addition to the conventional compressor 127) to meet or substantially meet an anticipated or potential HVAC load. It should be understood that while the HVAC system is shown to include a conventional compressor, in other embodiments, the conventional compressor may be excluded. It should also be understood that in other embodiments, other conventional-mechanical components of an HVAC system may be "electrified." In this regard, the now-electrified component may be driven or powered independent of operation of the engine. Thus, the disclosure contained herein that describes the electrification of primarily only the compressor and the fan of the HVAC system is not meant to be limiting. In this regard, the present disclosure contemplates more and different electrified components that may be included in the HVAC system, with all such variations intended to fall within the scope of the present disclosure.

The vehicle 100 is also shown to include a telematics unit 130. The telematics unit 130 may be structured as any type of telematics control unit. Accordingly, the telematics unit 130 may include, but is not limited to, a location positioning system (e.g., global positioning system) to track the location of the vehicle (e.g., latitude and longitude data, elevation data, etc.), one or more memory devices for storing the tracked data, one or more electronic processing units for processing the tracked data, and a communications interface for facilitating the exchange of data between the telematics unit 130 and one or more remote devices (e.g., a provider/manufacturer of the telematics device, etc.). In this regard, the communications interface may be configured as any type of mobile communications interface or protocol including, but not limited to, Wi-Fi, WiMax, Internet, Radio, Bluetooth, Zigbee, satellite, radio, Cellular, GSM, GPRS, LTE, and the like. The telematics unit 130 may also include a communications interface for communicating with the controller 150 of the vehicle 100. The communication interface for communicating with the controller 150 may include any type and number of wired and wireless protocols (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections provides the exchange of signals, information, and/or data between the controller 150 and the telematics unit 130. In other embodiments, a local area network (LAN), a wide area network (WAN), or an external computer (for example, through the Internet using an Internet Service Provider) may provide, facilitate, and support communication between the telematics unit 130 and the controller 150. In still another embodiment, the communication between the telematics unit 130 and the controller 150 is via the unified diagnostic services (UDS) protocol. All such variations are intended to fall within the spirit and scope of the present disclosure.

The vehicle 100 is also shown to include a diagnostic and prognostic unit 135. The diagnostic and prognostic unit 135 may be configured as any type diagnostic and prognostic unit. For example, in one embodiment, the diagnostic and prognostic unit may be configured as an on-board detection system. Accordingly, the diagnostic and prognostic unit 135 may be communicably coupled to one or more sensors, physical or virtual, positioned throughout the vehicle 100 such that the diagnostic and prognostic unit 135 may receive date indicative of one or more fault conditions, potential symptoms, and operating conditions to determine a status of a component (e.g., healthy, problematic, malfunctioning, etc.). If the diagnostic and prognostic unit 135 detects a fault, the diagnostic and prognostic unit 135 may trigger a fault code and provide an indication to the operator input/output device 140 of the vehicle (e.g., a check engine light, etc.).

The operator input/output device 140 enables an operator of the vehicle to communicate with the vehicle 100 and the controller 150. For example, the operator input/output device 140 may include, but is not limited, an interactive display (e.g., a touchscreen, etc.), an accelerator pedal, a clutch pedal, a shifter for the transmission, a cruise control input setting, etc. Via the input/output device 140, the operator can designate preferred characteristics of one or more vehicle parameters.

The vehicle 100 is further shown to include an accessory block 190. The accessory block 190 may house any type of accessory included in the vehicle. Accordingly, as shown, the accessory block 190 may be communicably and operatively coupled to one or more components of the powertrain system 110 (e.g., engine 101 and/or motor/generator 106) and the controller 150. As such, the controller 150 may selectively control each accessory of the accessory block 190. In some embodiments, power may be provided directly from the powertrain system 110 to the accessor(ies) of the accessory block 190. In other embodiments, power may be routed from the powertrain system 110 to the controller 150 to the accessor(ies) of the accessory block 190. In the latter configuration, the controller 150 may control or otherwise regulate power to the accessor(ies) of the accessory block 190. The accessories of the accessory block 190 may include, but are not limited to, any electrical powered accessory and non-electrical powered accessory. For example, the accessories may include, but are not limited to, a transmission fan, a waste heat recovery fan, a battery pack fan, power steering, an air compressor, a lube pump, a heating ventilation and air conditioning system, and an engine fan.

As shown, the controller 150 is communicably coupled to the powertrain system 110, the exhaust aftertreatment system 120, the telematics unit 130, the diagnostic and prognostic unit 135, and the operator input/output device 140. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a CAN bus provides the exchange of signals, information, and/or data. The CAN bus includes any number of wired and wireless connections. Because the controller 150 is communicably coupled to the systems and components in the vehicle 100 of FIG. 1, the controller 150 is structured to receive data (e.g., instructions, commands, signals, values, etc.) from one or more of the components shown in FIG. 1. This may generally be referred to as internal vehicle information 160 (e.g., data, values, etc.). The internal vehicle 160 information represents determined, acquired, predicted, estimated, and/or gathered data regarding one or more components in vehicle 100.

Accordingly, the internal vehicle information 160 may include data regarding the battery 107. As mentioned above, the data regarding the battery 107 may include, but is not limited to, a temperature of the battery, a current into or out of the battery, a number of charge-discharge cycles, a battery voltage, a battery state of charge, etc. The internal vehicle information 160 may also include information from the diagnostic and prognostic unit 135, which may include, but is not limited to, one or more fault codes, data identifiers, diagnostic trouble codes, and so on. The internal vehicle information 160 may also include data regarding the motor generator 106. Data regarding the motor generator 106 may include, but is not limited to, a power consumption rate, a power output rate, an hours of operation amount, a temperature, etc. The internal vehicle information 160 may also include other data regarding the powertrain system 110 (and other components in the vehicle 100). For example, the data regarding the powertrain system 110 may include, but is not limited to, the vehicle speed, the current transmission gear/setting, the load on the vehicle/engine, the throttle position, a set cruise control speed, data relating to the exhaust aftertreatment system 120, output power, engine speed, fluid consumption rate (e.g., fuel consumption rate, diesel exhaust fluid consumption rate, etc.), any received engine/vehicle faults (e.g., a fault code indicating a low amount of diesel exhaust fluid), engine operating characteristics (e.g., whether all the cylinders are activated or which cylinders are deactivated, etc.), etc. Data relating to the exhaust aftertreatment system 120 includes, but is not limited to, NOx emissions, particulate matter emissions, and conversion efficiency of one or more catalysts in the system 120 (e.g., the selective catalytic reduction catalyst).

The internal vehicle information may be stored by the controller 150 and selectively transmitted to one or more desired sources (e.g., another vehicle such as in a vehicle-to-vehicle communication session, a remote operator, etc.). In other embodiments, the controller 150 may provide the internal vehicle information 160 to the telematics unit 130 whereby the telematics unit transmits the internal vehicle information 160 to one or more desired sources (e.g., a remote device, an operator of the telematics unit, etc.). All such variations are intended to fall within the spirit and scope of the present disclosure.

In this regard because the components of FIG. 1 are shown to be embodied in a vehicle 100, the controller 150 may be structured as an electronic control module (ECM). The ECM may include a transmission control unit and any other one or more control units included in a vehicle (e.g., exhaust aftertreatment control unit, engine control module, powertrain control module, etc.). The function and structure of the controller 150 are shown described in greater detail in FIG. 2.

Figure 2:
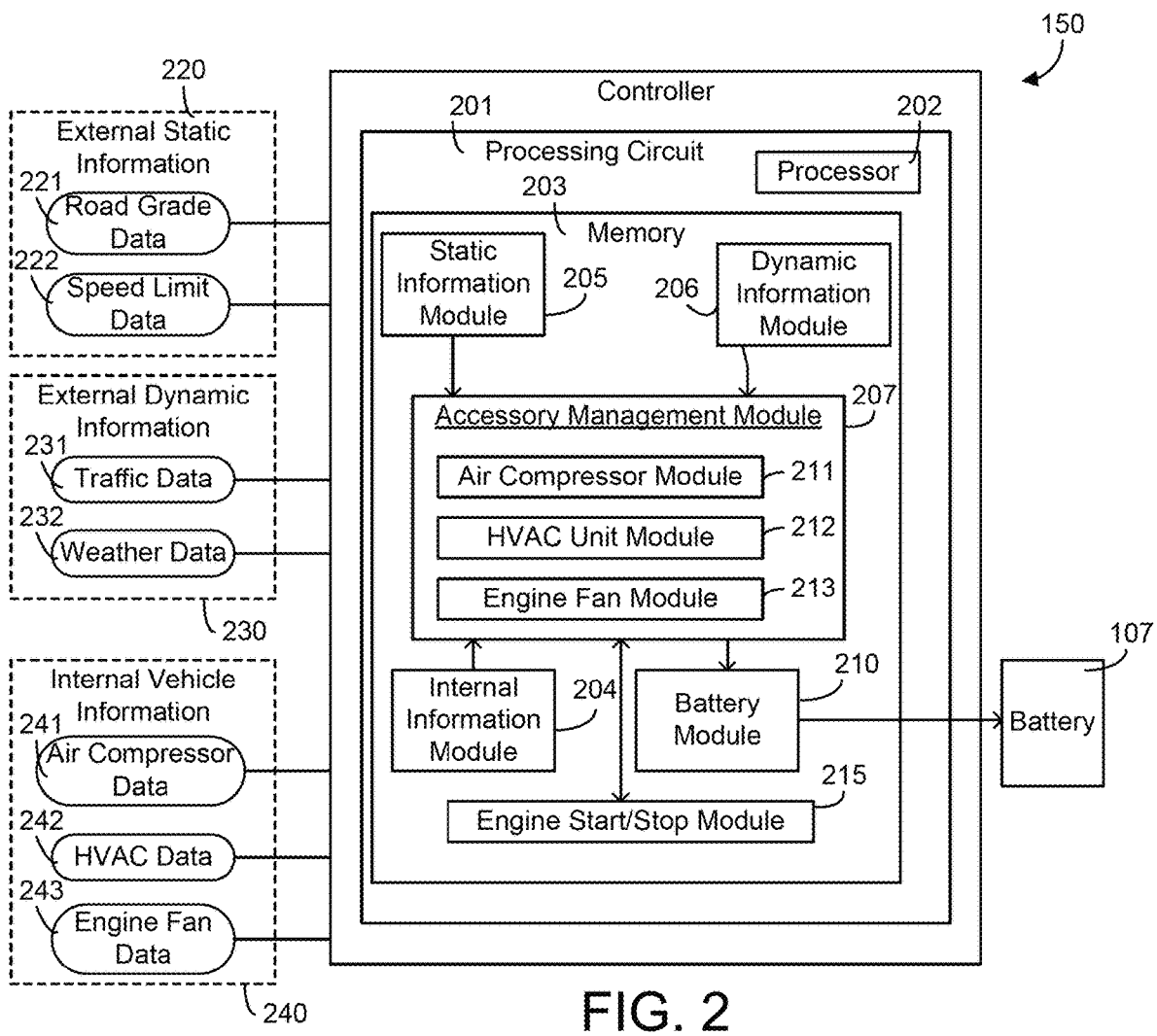
FIG. 2 is a schematic diagram of the controller used with the vehicle of FIG. 1, according to an example embodiment.

Accordingly, referring now to FIG. 2, the function and structure of the controller 150 are shown according to one example embodiment. The controller 150 is shown to include a processing circuit 201 including a processor 202 and a memory 203. The processor 202 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 203 (e.g., NVRAM, RAM, ROM, Flash Memory, hard disk storage, etc.) may store data and/or computer code for facilitating the various processes described herein. Thus, the one or more memory devices 203 may be communicably connected to the controller 150 and provide computer code or instructions to the controller 150 for executing the processes described in regard to the controller 150 herein. Moreover, the one or more memory devices 203 may be or include tangible, non-transient volatile memory or non-volatile memory. Accordingly, the one or more memory devices 203 may include database components, object code components, script components, or any other type of information structure for supporting the various activities and information structures described herein.

The memory 203 is shown to include various modules for completing the activities described herein. More particularly, the memory 203 includes an internal information module 204, a static information module 205, and a dynamic information module 206, a battery module 210, and an engine stop/start module 215, all of which are communicably coupled to an accessory management module 207. The modules are adapted to manage a power supply (i.e., battery 107) to meet or substantially meet a requested or predicted power and energy demand of various vehicle accessories based on at least one of internal vehicle information, external static information, and external dynamic information in accord with a prescribed objective function (e.g., minimize fuel consumption, minimize emissions, etc.). While various modules with particular functionality are shown in FIG. 2, it should be understood that the controller 150 and memory 203 may include any number of modules for completing the functions described herein. For example, the activities of multiple modules may be combined as a single module, as additional modules with additional functionality may be included, etc. Further, it should be understood that the controller 150 may further control other vehicle activity beyond the scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The internal information module 204 is structured to receive, gather, and/or acquire internal vehicle information 240. In one embodiment, the internal information module 204 includes one or more data acquisition devices within the vehicle 100, such as the diagnostic and prognostic unit 135, that facilitate acquisition of the internal vehicle information. In another embodiment, the internal information module 204 includes communication circuitry for facilitating reception of the internal vehicle information 240. In still another embodiment, the internal information module 204 includes machine-readable content for receiving and storing the internal vehicle information 240 (e.g., a databasing tool). In yet another embodiment, the internal information module 204 includes any combination of data acquisition devices, communication circuitry, and machine readable content. As mentioned above, the internal vehicle information 240 may include any type of internal information regarding the vehicle 100 and from the vehicle 100 itself (e.g., a vehicle speed, a load on the vehicle, a torque output, a transmission setting, an engine temperature, one or more fault codes or a history of fault codes, etc.). The internal information module 204 is structured to provide the acquired and/or gathered internal information to the accessory management module 207. While particular types of internal information are contemplated in the present disclosure, it should be understood that any type of internal information from any internal vehicle subsystem may be received at the internal information module 204.

In one embodiment, the internal vehicle information 240 includes air compressor data 241. The air compressor data 241 may include, for example, the amount of air stored in the air compressor and the energy produced and consumed by the air compressor. The internal vehicle information 240 further includes HVAC data 242. The HVAC data 242 may include various measured, determined, and/or estimated data regarding operation of the HVAC system 125. The HVAC data 242 may include a current condition (e.g., temperature) inside the hybrid vehicle and one or more settings (e.g., a user setting for air conditioning or heating in the vehicle). Additionally, the HVAC data 242 may include, but is not limited to, a coolant flow rate, which one of the one or more electric compressors 126 are on/off, data regarding the one or more active electric compressors 126 (e.g., speed, power output, etc.), a position of one or more valves (e.g., which branch lines to which electric compressors 126 are open, such that those electric compressors 126 are being utilized), a position of the thermostat (e.g., full open, full close, partially open), any fault information related to operation of the HVAC system 125, data regarding operation of the compressor 127 (if included in the HVAC system, whereby the data may include a power output, a speed, etc.), and so on. The internal vehicle information 240 further includes engine fan data 243. The engine fan data 243 may include an engine temperature set point and a current engine temperature, along with an energy usage of the engine fan.

The static information module 205 is structured to receive, gather, and/or acquire external static information 220 from one or more external static information sources (e.g., the map database 172) and provide or transmit the external static information to the accessory management module 207. The static information module 205 may also store the received external static information, where the storage configuration may be variable from application-to-application (e.g., store external static information for the past thirty days, etc.). In this regard, the static information module 205 may correlate various pieces of static information with frequently traveled routes for the vehicle 100 in order to facilitate fast retrieval and use. For example, if an operator frequently travels (e.g., once a month) from Wisconsin to Florida, the static information may include toll locations, intersections, speed limits, road grade, etc. for various parts along the route. Advantageously, this information may be recalled by the static information module 205 to provide to the accessory management module 207 on-demand. As mentioned above, the static information may include any piece of information or data that is static in nature (e.g., unchanging with respect to location, such as the road grade at a various location). Accordingly, the static information module 205 may include communication circuitry or other communication devices that facilitate the acquisition and reception of the external static information 220. In another embodiment, the static information module 205 may include machine readable content for facilitating the acquisition and reception of the external static information 220 (e.g., a database). In yet another embodiment, the static information module 205 may include any combination of hardware (e.g., communication components) and machine-readable content.

As mentioned above, the external static information 220 may include any piece or pieces of static information or data that is or primarily is static in nature (e.g., unchanging with respect to location). For example, one piece of static information may be stop locations (e.g., stop signs or stop lights) along a route of the vehicle. While these locations may change over time due to, e.g., the desires of a planning commission, the locations are primarily unchanging or static with respect to time. In this regard, the location of the stop locations are likely to remain the same over an extended period of time. Additional pieces of static information are described herein below.

As mentioned above, the external static information 220 may include road grade data 221. The road grade data 221 may generally relate to the incline or decline of a road. The road grade data 221 may be retrieved from a map database 172 or other source and may indicate the road grade for an upcoming stretch of road the vehicle 100 is expected to traverse. In some embodiments, the static information module 205 may provide an indication of the path of the vehicle 100 (e.g., navigation information, route information) and the appropriate road grade data 221 may be retrieved at the map database 172, other external source, or from a database within the vehicle 100 configured to store historical road grade data.

The external static information 220 may include speed limit data 222. The speed limit data 221 may generally relate to the speed limit of the road the vehicle is traversing. The speed limit data 221 may be retrieved from a map database 172 or other source. In some embodiments, the static information module 205 may provide an indication of the path of the vehicle 100 (e.g., navigation information and turn-by-turn directions from a GPS) and the appropriate speed limit data 222 may be retrieved at the map database 172 or other external source. In some embodiments, the speed limit data 222 includes construction speed limit data. The construction speed limit data may be transmitted to the vehicle 100 via a source local to the construction area (i.e., instead of retrieving speed limit data from a central database like map database 172, the speed limit data is retrieved from a local source associated with the construction).

The dynamic information module 206 is structured to receive, acquire, and/or gather external dynamic information 230 from one or more external dynamic information sources (e.g., a remote device, another vehicle, an infrastructure component, etc.). As mentioned above, the external dynamic information 230 may include any information or data that may change with respect to time and distance (e.g., the dynamic speed limits at construction sites, etc.). In response, the dynamic information module 206 is structured to transmit or provide the received external dynamic information 240 to the accessory management module 207. Similar to the static information module 205, the dynamic information module 206 may include one or more configurability options that dictate how long various pieces of dynamic information are stored. For example, the dynamic speed limit may be measured at a certain rate at a certain time and location, which is stored by the dynamic information module 206. The dynamic information module 206 may update the stored dynamic speed limit upon a manual update from the operator (e.g., a refresh input received via the I/O device 140) and/or upon a configuration that dictates or defines how often the dynamic data is provided to the controller 150. This may change as the vehicle is operated. Accordingly, the dynamic information module 206 is structured to update or trigger an update by sending an alert to the dynamic external information source in advance of the vehicle traveling towards a certain location. Like the static information module 205, the dynamic information module 206 may include communication circuitry (e.g., relays, wiring, etc.) or other communication devices that facilitate the acquisition and reception of the external dynamic information 230. In another embodiment, the dynamic information module 206 may include machine readable content for facilitating the acquisition and reception of the external dynamic information 230 (e.g., a database). In yet another embodiment, the dynamic information module 206 may include any combination of hardware (e.g., communication components) and machine-readable content.

As mentioned above, the external dynamic information 230 may include any piece or pieces of dynamic information or data that is or primarily is dynamic in nature (e.g., changes with respect to time). For example, one piece of dynamic information may be a stop time at one or more stop locations (e.g., stop signs or stop lights) along a route of the vehicle. From the periods of 8 am-9 am, the stop time at a particular location is approximately forty-five seconds while during the times of 10:30 am-11:30 am, the stop time at the particular location is approximately twenty-five seconds. Thus, the data regarding the stop time at this location is dynamic in nature due to the data changing or having the ability to change as a function of time. Additional pieces of dynamic information are described herein below.

The external dynamic information 230 may include traffic data 231. The traffic data 231 may generally relate to the if there is heavy or light traffic, if there are any accidents, constructions, or other obstacles in front of the vehicle 100, and the like. The precise delineations of heavy or light traffic are highly configurable. For example, "heavy" or "light" may be road or road segment specific and based on a time of day (e.g., rush hour versus non-peak travel times, highways versus rural streets, etc.). In another example, "heavy" or "light" may be based on an average number of vehicles on a particular route segment at a particular time (e.g., a nominal value), where "heavy" or "light" is based on the number of vehicles at that time relative to the nominal value. Accordingly, the terms "heavy" or "light" in regard to traffic conditions are intended to be broadly interpreted with all such variations intended to fall within the spirit and scope of the present disclosure. For example, the traffic data 231 may be used to determine if there is a traffic jam ahead, if there are stop-and-go conditions ahead, and if there are any other obstacles that may impact the vehicle 100 from operating in a "normal" state (i.e., minimal stop-and-go conditions, minimal slow-down conditions).

The external dynamic information 230 may include weather data 232. The weather data 232 may generally relate to current and/or future or potentially future weather conditions along the expected path of the vehicle 100. For example, the weather data 232 may include a temperature, wind conditions, and any other information that may impact the performance of the vehicle and its subsystems (i.e., if cooler or warmer temperatures impact the HVAC unit, if severe weather impacts the speed of the vehicle 100, etc.).

In regard to either the external dynamic information or the external static information, both pieces may be received by each respective module 205 and 206 in advance of the vehicle 100 traveling a route or reaching a location. For example, if an operator designates a route for the vehicle 100, then the modules 205 and 206 may provide requests to the external static and dynamic information sources to receive the data at various points along the route. The external dynamic information may be periodically updated to account for changing conditions. If the operator does not designate a route, the modules 205 and 206, based on the current location and direction of travel of the vehicle 100, may utilize a relatively smaller window to request static and dynamic external information for locations/spots/positions that the vehicle 100 is likely to encounter. For example, if the operator is on a road with no turn-offs for two miles, the modules 205 and 206 can request dynamic and static external information for those two miles because the controller 150 may determine that the vehicle 100 must continue on this path. If the vehicle is in a busy area in a metropolitan area where one of several different routes may be traversed at any moment, the modules 205 and 206 may employ a region or zone of interest for acquiring external static and dynamic information (e.g., a two square mile radius or any predefined radius about the vehicle). The received data may then be correlated or associated with wherever the operator chooses to direct the vehicle 100 within that two square mile zone of interest. This zone of interest may then move with the vehicle 100. Of course, it should be understood that the present disclosure contemplates other techniques, methods, and strategies that may be used to control the frequency of external dynamic and static data providing based on location, such that all possible strategies are intended to fall within the spirit and scope of the present disclosure.

Turning now to the accessory management module 207, as shown, the accessory management module 207 is structured to receive the internal vehicle information, external static information, and external dynamic information from each of the internal information module 204, static information module 205, and dynamic information module 206, respectively. In response, the accessory management module 207 is structured to selectively control the operation of one or more electronic accessories of the vehicle 100. In one embodiment, the accessory management module 207 manages the output of the battery 107 via the battery module 210 to the electronic accessories. In other embodiments, the accessory management module 207 controls the operation of the electronic accessories.

The accessory management module 207 is shown to include a plurality of sub-modules for each electronic accessory in the vehicle 100. As shown, the accessory management module 207 includes an air compressor module 211, a HVAC unit module 212, and an engine fan module 213. While the present disclosure describes the control of particular electronic accessories, it should be understood that the accessory management module 207 may further be configured to control any electronic accessory of the vehicle 100 in a similar manner to that described in the present disclosure for the air compressor, HVAC system 125 (e.g., a component thereof), transmission fan, waste heat recovery fan, battery pack fan, power steering, and engine fan. In this regard and in some embodiments, one or more of the accessories of the accessory block 190 may be included with the accessory management module 207. In another embodiment, the accessory management module 207 may include communication circuitry for facilitating the exchange of information, instructions, commands, values, messages, and the like with one or more accessor(ies) of the accessory block 190. In yet another embodiment, the accessory management module 207 may include machine-readable media for facilitating the exchange of information between the accessory management module 207 and the accessories. In still another embodiment, the accessory management module 207 may include any combination of machine-readable media, communication circuitry, and the accessories themselves or portions thereof.

The air compressor module 211 is structured to control the operation of the air compressor of the vehicle 100. The air compressor module 211 receives internal vehicle information such as air compressor data 251, external static information such as road grade data 221 and speed limit data 222, and external dynamic information such as traffic data 231. The air compressor module 211 may use the information to determine a mode of operation for the air compressor.

As one example, the air compressor module 211 may use the road grade data 221 to determine if the vehicle 100 is or will be traveling downhill. If the vehicle 100 travels downhill, the driver of the vehicle is likely to brake or at least stop accelerating in order to maintain a vehicle speed while traveling downhill. The air compressor module 211 may estimate an amount of potential energy (e.g., the energy created by the gravitational pull associated with the vehicle rolling downhill) and braking energy that may be produced by the driver braking or stopping accelerating. The air compressor module 211 may then cause the air compressor to run. The air compressor may be run using the potential energy and the braking energy that is captured. In other words, the air compressor may be run using energy that is generated based on the road grade and the vehicle traveling downhill, instead of using energy from the battery 107, for example. The air compressor module 211 may estimate the amount of such energy available, and the accessory management module 207 may be configured to distribute the energy across various electronic accessories of the vehicle 100.

As another example, the air compressor module 211 may use the speed limit data 222 to determine if the vehicle 100 will be increasing or decreasing speed, based on an increasing or decreasing speed limit. If the vehicle 100 is expected to slow down, the kinetic energy of the vehicle is expected to reduce as the vehicle slows down. The air compressor module 211 may be structured to allow the air compressor to capture the free kinetic energy that would otherwise disappear as the vehicle 100 slows down. The air compressor module 211 may cause the air compressor (e.g., an air tank fluidly coupled thereto) to charge in response to the vehicle slowing down.

As yet another example, the air compressor module 211 may use the traffic data 231 to determine if the vehicle 100 is about to encounter heavy traffic. In a heavy traffic condition, the driver of the vehicle 100 may need to brake often which may stress various vehicle accessories. For example, in a heavy traffic condition, the air compressor may cycle on and off to account for the changing conditions in the vehicle 100. The air compressor module 211 may be structured to determine when the vehicle 100 is approaching a heavy traffic condition, and may recharge the air compressor before the vehicle 100 encounters the heavy traffic condition. The recharged air compressor allows for sufficient air for braking maneuvers, and may help avoid the air compressor cycling between an on and off position. This may prevent suboptimal operation of the air compressor to thereby saving energy.

The HVAC unit module 212 is structured to control the operation of the HVAC unit 125 of the vehicle 100. The HVAC unit module 212 receives internal vehicle information such as HVAC unit data 252, external static information such as road grade data 221, and external dynamic information such as traffic data 231 and weather data 232. The HVAC unit module 212 may use the information to determine a mode of operation for the HVAC unit. For example, the HVAC unit module 212 may assess various conditions to determine whether to pre-heat or pre-cool the cabin of the vehicle 100 based on the conditions. Other control operations are described herein below.

As one example, the HVAC unit module 212 may use the road grade data 221 to determine if the vehicle 100 is or will be traveling uphill or downhill, which may impact the power available to the HVAC unit. For example, if the vehicle 100 is about to encounter an uphill portion of the road, the HVAC unit module 212 may estimate that the HVAC unit will have less power available for operation as power is routed to other vehicle accessories. The HVAC unit module 212 may then cause a pre-heating or pre-cooling of the cabin before the uphill portion of the road is encountered, so that less power is used to heat or cool the cabin during the uphill climb. If the vehicle 100 is about to encounter a downhill portion of the road, the HVAC unit module 212 may estimate an amount of potential energy (e.g., the energy created by the gravitational pull associated with the vehicle rolling downhill) and braking energy that may be produced by the driver braking or stopping accelerating. This power may be used, at least in part, to power the HVAC unit. The current heating or cooling of the vehicle cabin may be adjusted based on the knowledge that an additional power source may be available soon when the vehicle 100 encounters the downhill portion of the road.

As another example, the HVAC unit module 212 may use the traffic data 231 to determine if the vehicle 100 is about to encounter heavy traffic. Based on the traffic data 231, the HVAC unit module 212 may determine a change in energy consumption of the vehicle 100, and therefore the energy available to the HVAC unit. The HVAC unit module may pre-heat or pre-cool the cabin of the vehicle 100 in response to the potential change in energy consumption of the vehicle. For example, the cabin may be pre-heated or pre-cooled in response to an expected reduction in energy available to the HVAC unit in the near future.

As another example, the HVAC unit module 212 may use the weather data 232 to determine HVAC unit operation. In one embodiment, if the weather data 232 indicates a dropping temperature, the HVAC unit module 212 may reduce the amount of energy used to operate a cooling mode of the HVAC unit (or increase the amount of energy used to operating a heating mode). Similarly, if the weather data 232 indicates a rising temperature, the HVAC unit module 212 may reduce the amount of energy used to operate a heating mode of the HVAC unit (or increase the amount of energy used to operate a cooling mode). In one embodiment, the HVAC unit module 212 may assess the heat rejection capabilities of the HVAC unit. Based on the changing weather conditions, the heat rejection capabilities of the HVAC unit may increase or decrease, and the power supplied to the HVAC unit may be increased (if heat rejection capabilities are reduced) or decreased (if heat rejection capabilities are increased).

As yet another example, the HVAC unit module 212 may use at least one of the internal vehicle information 240, external static information 220, and the external dynamic information 230 to control operation of the at least one electric compressor 126 and (when implemented) the conventional compressor or conventional compressors 127 of the HVAC system 125. In this regard, the HVAC unit module 212 may regulate the cooling load across the one or more electric compressors 126 and conventional compressor(s) 127. Beneficially, such management and regulation may provide enhanced levels of control over the HVAC system 125 to, among other benefits, improve efficiency of operation of the HVAC system 125. This may be due to, at least in part, the ability to implement smaller compressors (both electric and conventional) with the HVAC system than in conventional HVAC systems, whereby the relatively smaller compressors correspond with higher level operating efficiencies than their larger counterparts.

As one example, at an engine stop condition (i.e., where the engine of the vehicle is turned off, such as described herein with respect to the engine stop/start module 215), the HVAC unit module 212 may operate fewer electric compressors 126 at relatively more efficient operating points than a single compressor at an efficient operating point. However, if the cooling capacity requirement is relatively high (i.e., a need to maintain air conditioning to provide a relatively cool cabin temperature, such as when the vehicle is in a high temperature region) and the engine is off, the HVAC unit module 212 may then selectively cause the engine to turn on to, e.g., power the conventional compressor 127 and selectively power each of the electric compressors 126 to meet or substantially meet the cooling load.

In this regard, the HVAC unit module 212 may prioritize between use of the one or more electric compressors 126 (or other electric component in the electric HVAC system) and conventional systems (e.g., conventional compressor 127) based on battery health information and information on energy required for engine start. For example, the HVAC unit module 212 may cause each of the one or more electric compressors 126 to operate until the battery capacity falls below a threshold (e.g., the minimum amount of battery power needed to restart the engine, another predefined threshold, etc.) when, in turn, the HVAC unit module 212 provides a command to the engine stop/start module 215 to then re-start the engine to in turn cause activation of the conventional compressor 127.

Additionally, the HVAC unit module 212 may use diagnosis and prognosis information from on board components (e.g., internal vehicle information 240 from the diagnostic and prognostic unit), including all compressors in order to regulate HVAC load better. For example, if a single compressor fails, the HVAC unit module 212 may reduce the cooling load on that compressor and increase load on the other compressors such that operator cabin comfort is not compromised. Thus, the HVAC unit module 212 may operate in response to the diagnostic and/or prognostic information regarding the operation of the electric and/or conventional compressors (or, more generally, the electric and conventional components of the HVAC system).

As mentioned above, the HVAC unit module 212 may also control operation of the HVAC system 125 in response to external static information 220. For example, based on external static information (e.g., road grade, vehicle stop and idle information, speed limits, intersections, etc.), the HVAC unit module 212 may make smart decisions regarding the use of the conventional compressor(s) 127 and the electric compressor(s) 126 based on current and expected engine operating points, current and expected battery/alternator loads, etc. As an example, if two of three electric compressors are active, the air conditioning is on, and there is an upcoming hill as determined by an upcoming certain road grade threshold, the HVAC unit module 212 may activate the third electric compressor to alleviate the load on the conventional compressor (if there is one) that may be otherwise experienced based on the upcoming road grade. As such, relatively more efficient operation of the components of HVAC system may be experienced.

As also mentioned above, the HVAC unit module 212 may also control operation of the HVAC system 125 in response to external dynamic information 230. For example, based on external dynamic information (e.g., traffic, weather, etc.), the HVAC unit module 212 may make smart decisions regarding the use of the conventional compressor(s) 127 and the electric compressor(s) 126 based on current and expected engine operating points, current and expected battery/alternator loads, etc. As an illustration, traffic conditions may indicate an upcoming traffic jam and the ambient air temperature is over one-hundred (100)

degrees Fahrenheit, such that the cabin temperature is approximately seventy (70) degrees Fahrenheit. Typically, the conventional compressor would operate at higher levels of inefficiencies during this slowdown due to the relatively slower operation of the engine when the vehicle is stuck in this traffic. However and in contrast, the HVAC unit module 212 may cause operation of the conventional compressor 127 to correspond with that of the engine, such that additional power output from the conventional compressor is not being demanded. Rather, the HVAC unit module 212 may activate all or mostly all of the electric compressors and/or increase the operating point of some of the electric compressors. As a result, the cabin temperature may be maintained without drastic effects to the efficiency of the HVAC system 125.

Thus, the strategic operation of the HVAC unit module 212 with respect to the one or more conventional compressors 127 and electric compressors 126 may result in an increase in efficiency of the HVAC system 125 overall.

The engine fan module 213 is structured to control the operation of the engine fan of the vehicle 100. The engine fan module 213 receives internal vehicle information such as engine fan data 253, external static information such as road grade data 221, and external dynamic information such as traffic data 231 and weather data 232. The engine fan module 213 may use the information to determine a mode of operation for the engine fan. For example, the engine fan module 213 may assess various conditions to determine whether to pre-heat or pre-cool the engine or engine coolant of the vehicle 100, via the engine fan, based on the conditions.

As one example, the engine fan module 213 may use the road grade data 221 to determine if the vehicle 100 is or will be traveling uphill or downhill. Based on the determination, the engine fan module 213 may control the operation of the engine fan in order to pre-cool or pre-heat the engine coolant or pre-cool the engine. For example, if the vehicle 100 will be traveling uphill, thee engine may have to work harder to operate, and the power output to the engine fan may be increased in order to provide increased cooling to the engine and engine coolant in response. Alternatively, if the vehicle 100 will be traveling downhill, energy generated from the vehicle traveling downhill may be used to supply power to the engine fan. As another example, the engine fan module 213 may use the traffic data 231 or the weather data 232 to determine engine fan operation, in a manner similar to that as described with respect to HVAC unit module 212.

The battery module 210 is structured to receive data indicative of the battery 107 and control operation of the battery 107. In one embodiment, the battery module 210 includes the battery 107 and any other hardware components associated with the electronic accessories. In some embodiments, the battery module 210 may include a battery monitoring system. In another embodiment, the battery module 210 includes communication circuitry to provide one or more commands to the battery 107 or charging/discharging the controller operatively attached thereto. In yet another embodiment, the battery module 210 includes machine-readable content for facilitating the reception and provision of various commands to control the battery 107.

The battery module 210 may control the output of the battery 107 to the various electronic accessories of the vehicle 100. For example, the battery module 210 may receive information from accessory management module 207 relating to desired operating parameters of one or more vehicle accessories. The battery module 210 may be configured to control the output of the battery 107 to each individual accessory, controlling the power output of the battery 107 and optimizing the amount of energy used by each individual accessory. For example, the battery module 210 may cut off supply from the battery 107 to the air compressor if the vehicle is about to travel downhill (as energy for the air compressor may be generated from other sources than the battery 107).

As also shown, the controller 150 also includes an engine stop/start module 215. The engine stop/start module 215 is structured to receive the internal information, external static information, and external dynamic information from each of the internal information module 204, static information module 205, and dynamic information module 206, respectively. In response, the engine stop/start module 215 is structured to selectively enable/disable the stop/start function for the engine 101. The stop/start function controls the selective activation and deactivation of the engine 101 during operation of the vehicle 100 (i.e., turning the engine on or off according to one or more various predefined criteria, such as the stopping of the vehicle for more than a predefined amount of time (e.g., three seconds) may cause the turning off of the engine, etc.). As a result, the start-stop function may stop the engine 101 during periods of idling (e.g., while the vehicle is stopped at a stop light) to conserve fuel.

The internal information, external static information, and external vehicle information may be used as an enabler for the stop/start function (e.g., to turn the stop/start function on or off, such that if it is on, the selective engine turn-offs (i.e., stops) may be employed). In particular, the impact of the aforementioned information on or potentially on the HVAC system 125 may be used as the enabler for the stop/start function, such that operator comfort/other cooling needs (temperature sensitive load such as produce) are ensured or substantially ensured irrespective of engine stop events and engine stop time.

With the above in mind and with respect to internal vehicle information, the stop/start module 215 may control the stop/start function based on at least one of a HVAC system 125 requirement and a battery condition. For example, if the vehicle is in a hot temperature zone (e.g., ambient temperature is greater than 80 degrees Fahrenheit or another predefined "hot temperature" threshold), the operator may desire to use the air conditioning of the HVAC system. However and assuming this is a mining vehicle (in this example), the operator may be simply waiting to be loaded with excavated material (e.g., idling), such that the operator would not like to keep the engine on for the whole duration in order to avoid excessive fuel consumption. In this case, operator comfort may also be of importance due to the relatively high outside ambient temperature. In response, the stop/start module 215 may then turn the engine off, provide a command to the HVAC unit module 212 to activate the one or more electric compressors 126 to maintain the air conditioning (and desired cabin temperature). However, upon receiving data indicating that the battery level is at or below a predefined threshold (e.g., a threshold amount of current needed to re-start the engine, etc.), the stop/start module 215 may disable the stop/start function and re-start the engine to continue normal operation without engine stop/starts. The stop/start module 215 may then monitor the charge of the battery until the charge is at or above a predefined threshold whereby the stop/start function may be re-enabled. Thus, the data regarding the HVAC system 125 itself becomes an enabler/disabler of the stop/start function provided by the stop/start module 215.

As another example, the stop/start module 215 may use diagnosis and prognosis information from on-board components to make decisions on use of the HVAC system, loading on battery, etc. As an example, if the diagnosis and prognosis information indicates that the battery is critically depleted, the stop/start module 215 may disable the stop/start function. In this regard, additional potential battery drains from engine re-starts are avoided.

As mentioned above, external static information regarding an impact or potential impact on the HVAC system 125 may also be used by the stop/start module 215 to enable/disable the stop/start function. For example, the stop/start module 215 may use look ahead information on vehicle stop and idle events to make a decision on pre-cooling or pre-heating the cabin for higher fuel economy and system efficiency from the vehicle/machine. As another example, the stop/start module 215 may use static information on speed limits in order to intelligently pre-cool or pre-heat the cabin. As yet another example, the stop/start module 215 may use static information on upcoming intersections/turns to intelligently pre-cool or pre-heat the cabin. Additionally, the stop/start module 215 may use information regarding upcoming grade information to make smart decisions to pre-cool/pre-heat/shut-off the electronic components of the electronic HVAC system in order for the engine to provide more power to the driveline. As still a further example, the stop/start module 215 may use static information regarding available charging locations in order to pre-cool/pre-heat the cabin so the battery is optimally or nearly optimally loaded relative to the various determined plug-in locations.

Further yet, external dynamic information regarding an impact or potential impact on the HVAC system 125 may also be used by the stop/start module 215 to enable/disable the stop/start function. For example, the stop/start module 215 may cooperate with the HVAC unit module 212 to pre-cool/pre-heat the cabin based on traffic information/stop-go traffic information. As another example, the stop/start module 215 may cooperate with the HVAC unit module 212 to pre-cool/pre-heat cabin/regulate the HVAC battery load based on weather information.

Thus and beneficially, the stop/start module 215 may cooperate with the HVAC unit module 212 based on at least one of the internal, external static, and external dynamic information to selectively enable/disable the stop/start function of the vehicle to, in turn, potentially increase the efficiency of the vehicle or a component thereof.

Based on the foregoing, one example operation of the controller 150 may be described as follows. The controller may receive or acquire external static information indicative of a location of one or more stop locations on the route of the vehicle, and receive or acquire external dynamic information indicative of an estimated stop time at one or more of the stop locations. Based on this information, the controller may determine that the estimated stop time at a stop location is at or greater than a predefined threshold. Of course, the "predefined threshold" is a highly variable term, such that those of ordinary skill in the art will readily appreciate the broad range of values that may be used to define the predefined threshold term. That being said and in response to the foregoing, the controller 150 may one of pre-heat or pre-cool a cabin of the hybrid vehicle using power from at least one of the battery system and a regenerative braking system; one of pre-heat or pre-cool at least one of an engine and engine coolant of the hybrid vehicle by controlling operation of an engine fan; and/or pre-charge a compressor of the hybrid vehicle. Beneficially, such operations take advantage of the route and the changing conditions thereof to increase or potentially increase an operational efficiency of the vehicle overall as well as provide for operator comfort.

Figure 3:
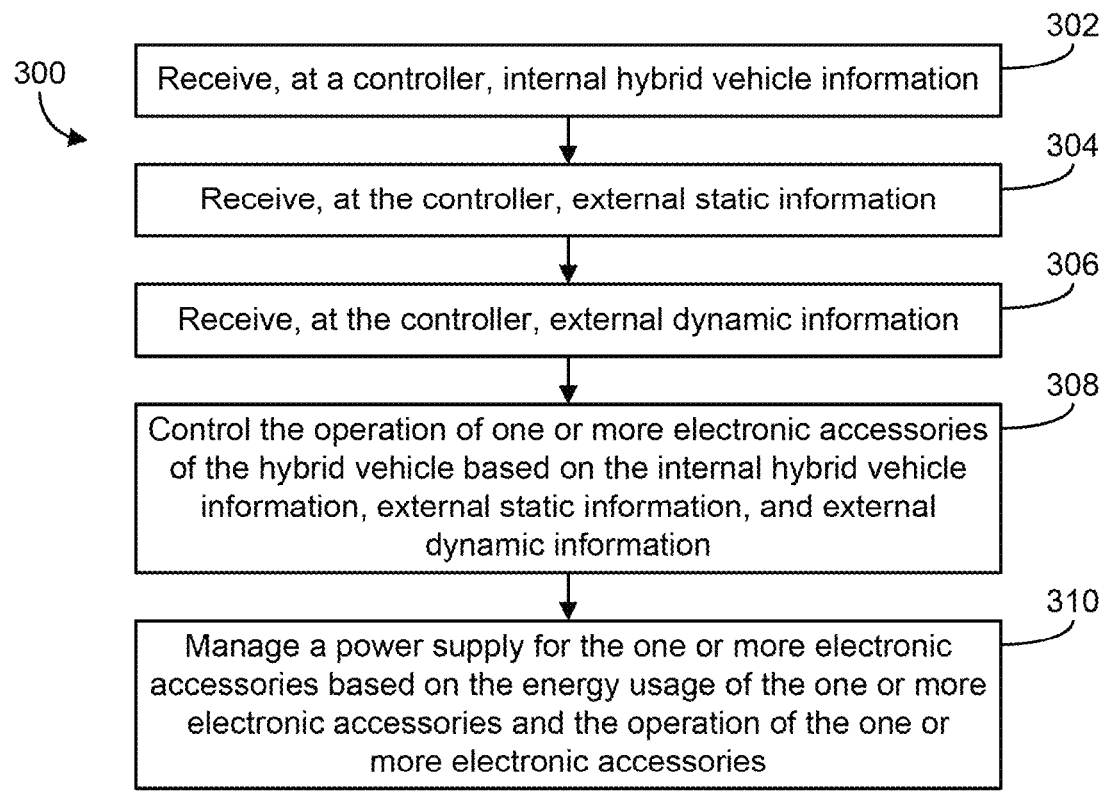
FIG. 3 is a flow diagram of a method of controlling the operation of one or more electronic accessories of a vehicle, according to an example embodiment.

Referring now to FIG. 3, a flow diagram of a method 300 of controlling the operation of one or more electronic accessories of a vehicle is shown, according to an example embodiment. The method 300 may be executed by, for example, the controller 150 as described in FIG. 2. The method 300 includes receiving, by the controller, internal hybrid vehicle information (block 302), external static information (block 304), and external dynamic information (block 306).

The internal hybrid vehicle information received at block 302 may generally include information about one or more electronic accessories of the hybrid vehicle. The electronic accessories may include, for example, an air compressor, an HVAC unit, and an engine fan. While FIG. 3 is described with reference to these three accessories, it should be understood that the method 300 may be applicable towards any type of vehicle accessory without departing from the scope of the present disclosure. The internal hybrid vehicle information for each accessory may include a current mode of operation for the accessory (e.g., on or off, high, medium, or low setting, etc.), the power currently used by the accessory, any faults or warnings associated with the use of the accessory, and any other information potentially relevant to the energy usage of the accessory.

The external static information received at block 304 may generally include information retrieved from one or more external static information sources, such as a map database 172. The external static information may relate to information about frequently traveled routes. For example, external static information may include toll locations, intersections, speed limits, road grade, etc. for various parts along the routes. In some embodiments, external static information may be retrieved at block 304 for one iteration of the method 300, and then retrieved from a database local to the controller 150 in a subsequent iteration of the method 300.

The external dynamic information received at block 306 may generally include information retrieved from one or more external dynamic information sources. The sources may include, for example, a remote device, another vehicle, or an infrastructure component. External dynamic information may include any information that can change with respect to time and distance. For example, external dynamic information can include speed limits at construction sites or other areas, weather information, current traffic conditions, and the like.

The method 300 further includes controlling the operation of one or more electronic accessories of the hybrid vehicle (block 308). The one or more electronic accessories of the hybrid vehicle are controlled based on the internal hybrid vehicle information, external static information, and external dynamic information. For example, based on the external static information regarding a road grade, the operation of the air compressor of the vehicle may be adjusted to account for a downhill or uphill climb.

The method 300 further includes managing a power supply for the one or more electronic accessories (block 310). The power supply is managed based on the energy use of the electronic accessories and the operation of the electronic accessories. For example, if the operation of the air compressor includes a pre-charging command, the power supply for the air compressor may be managed such that more power is applied to the air compressor. As another example, if external static information indicates a potential for the vehicle to recover energy from normal vehicle operation, block 310 may include harvesting the energy and supplying the energy to, for example, the air compressor.

Referring also to FIG. 4-7, more particular embodiments of the method 300 are described. The methods of FIGS. 4-7 describe particular embodiments of the method 300 for specific electronic accessories and specific received information. While FIGS. 4-7 describe detailed embodiments, it should be understood that the examples provided in FIGS. 4-7 are not limiting and other control of electronic accessories is possible based on any type of received information.

Figure 4:
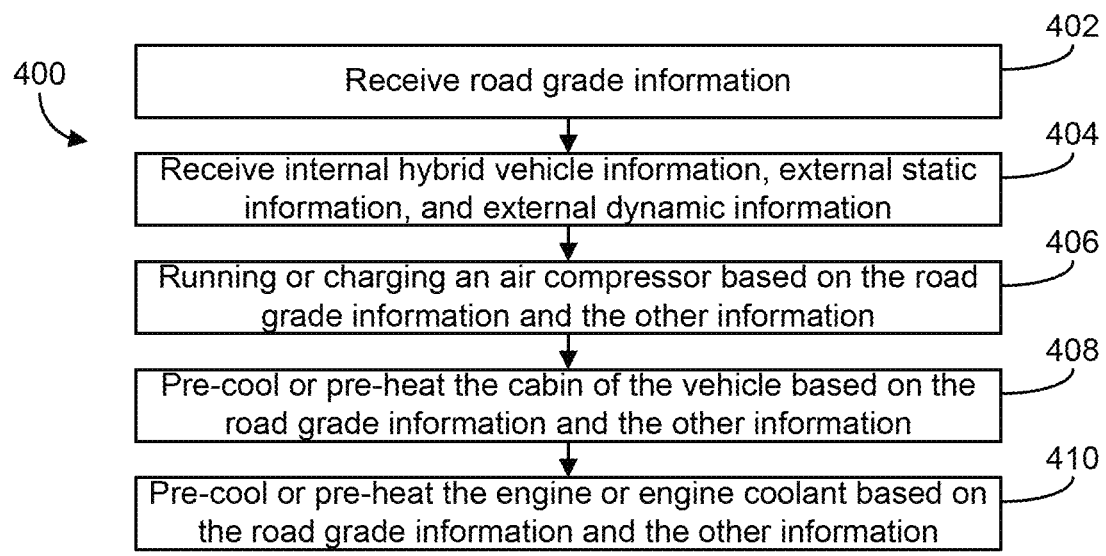
FIG. 4 is a flow diagram of a method of controlling the operation of one or more electronic accessories using road grade information, according to an example embodiment.

Referring to FIG. 4, a method 400 of controlling the operation of one or more electronic accessories using road grade information is shown, according to an exemplary embodiment. The method 400 includes receiving road grade information (block 402). The road grade information may generally indicate an incline or decline of the road the vehicle is traversing. The road grade information may indicate any incline and/or decline in the road, along with any duration information (e.g., how long the road inclines or declines). The method 400 further includes, based on the road grade information, determining if the vehicle will be traveling downhill or uphill (block 404). The method 400 further includes receiving internal hybrid vehicle information, external static information, and external dynamic information (block 406).

The method 400 further includes running or charging an air compressor based on the road grade information and the other information using available energy (block 408). For example, if the road grade information indicates an upcoming downhill road, the air compressor may be run using energy available from the downhill road. On a downhill road, there may be potential energy available based on the motion of the vehicle, and there may be braking energy based on the application of the brakes during the downhill run. This energy may be captured and provided to the air compressor for running the air compressor. As another example, if the road grade information indicates an upcoming uphill road, the air compressor may be pre-charged before encountering the uphill part of the road, to account for the fact that less energy may be available during the uphill run.

The method 400 further includes pre-cooling or pre-heating the cabin of the vehicle based on the road grade information and the other information (block 410). An HVAC unit of the vehicle may pre-cool or pre-heat the cabin using energy, accounting for the fact that more or less energy may be available during a downhill or uphill run. In other words, the HVAC unit is operated more efficiently based on the expected power available to the HVAC unit during a downhill or uphill run. The method 400 further includes pre-cooling or pre-heating the engine or engine coolant based on the road grade information and the other information (block 412). An engine fan may pre-cool or pre-heat the engine or engine coolant, accounting for the fact that more or less energy may be available during a downhill or uphill run.

Figure 5:
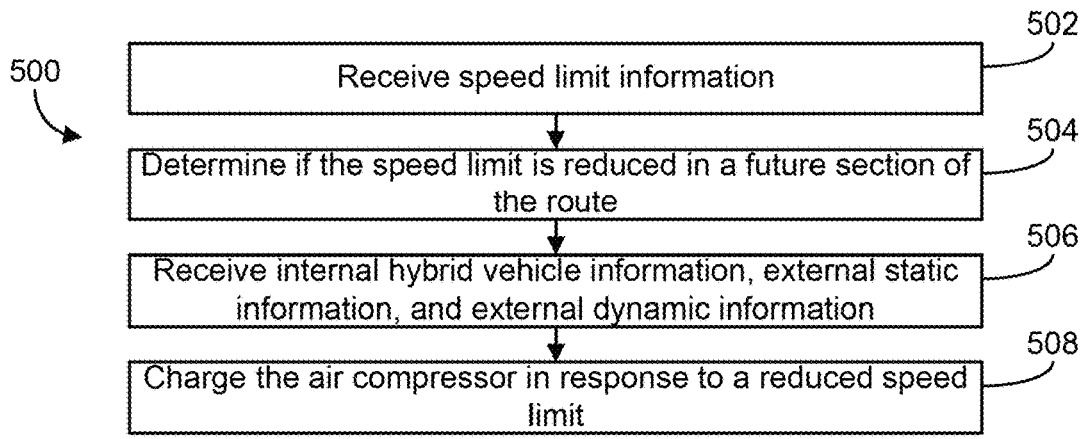
FIG. 5 is a flow diagram of a method of controlling the operation of one or more electronic accessories using speed limit information, according to an example embodiment.

Referring to FIG. 5, a method 500 of controlling the operation of one or more electronic accessories using speed limit information is shown, according to an exemplary embodiment. The method 500 includes receiving speed limit information (block 502). The speed limit information may generally include the speed limit of the route the vehicle is traversing. The speed limit information may further include speed limit information along a route the vehicle is going to traverse (i.e., a route identified by a GPS module of the vehicle). The speed limit information may include a normal speed limit for an area or a construction speed limit (or other special speed limit for an area). The method further includes determining if the speed limit is reduced in a future section of the route (block 504). The method 500 further includes receiving internal hybrid vehicle information, external static information, and external dynamic information (block 506).

The method further includes charging the air compressor in response to a reduced speed limit (block 508). If the vehicle is approaching a reduced speed limit, the controller of the vehicle may anticipate a reduction in the vehicle speed, resulting in a reduction of the current kinetic energy of the vehicle. At block 508, the kinetic energy may be used to charge the air compressor (e.g., an air tank), as this energy is "free" since the vehicle will be slowing down.

Figure 6:
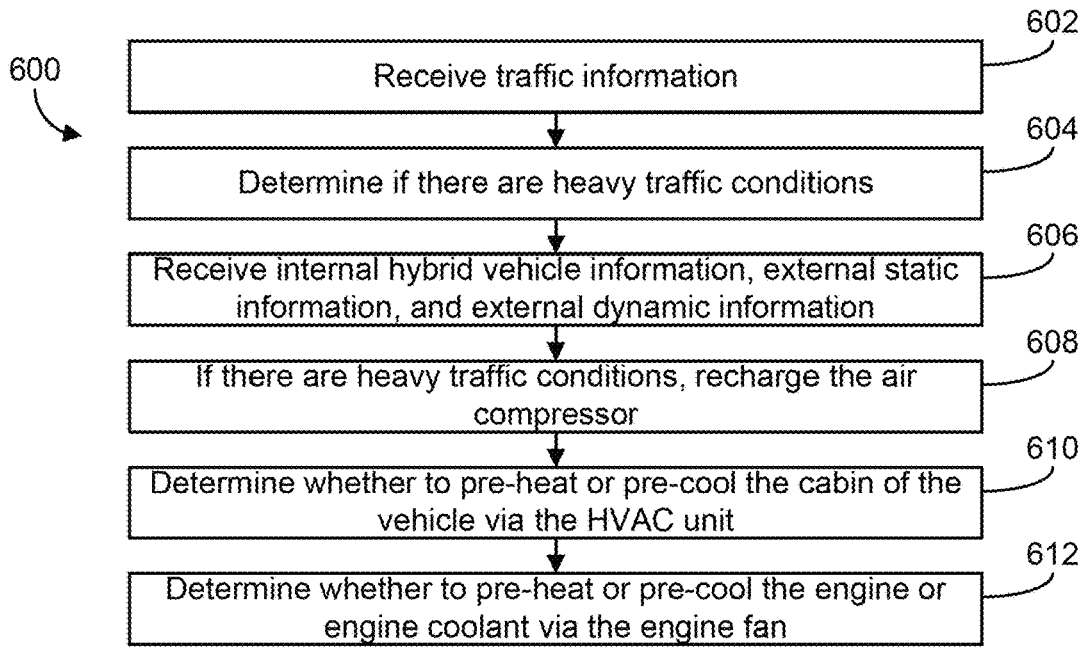
FIG. 6 is a flow diagram of a method of controlling the operation of one or more electronic accessories using traffic information, according to an example embodiment.

Referring to FIG. 6, a method 600 of controlling the operation of one or more electronic accessories using traffic information is shown, according to an exemplary embodiment. The method 600 includes receiving traffic information (block 602). The traffic information may generally indicate the traffic conditions along the route the vehicle is traversing. The method 600 further includes determining if there are heavy traffic conditions (block 604). The method 600 further includes receiving internal hybrid vehicle information, external static information, and external dynamic information (block 606).

The method 600 further includes, if there are heavy traffic conditions, recharging the air compressor (block 608). If the vehicle is approaching heavy traffic, significant braking action is expected to occur, and the air compressor might cycle between an on and off state more frequently. The air compressor may be recharged to compensate for such action. The method 600 further includes determining whether to pre-heat or pre-cool the cabin of the hybrid vehicle via the HVAC unit (block 610) and whether to pre-heat or pre-cool the engine or engine coolant via the engine fan (block 612).

Figure 7:
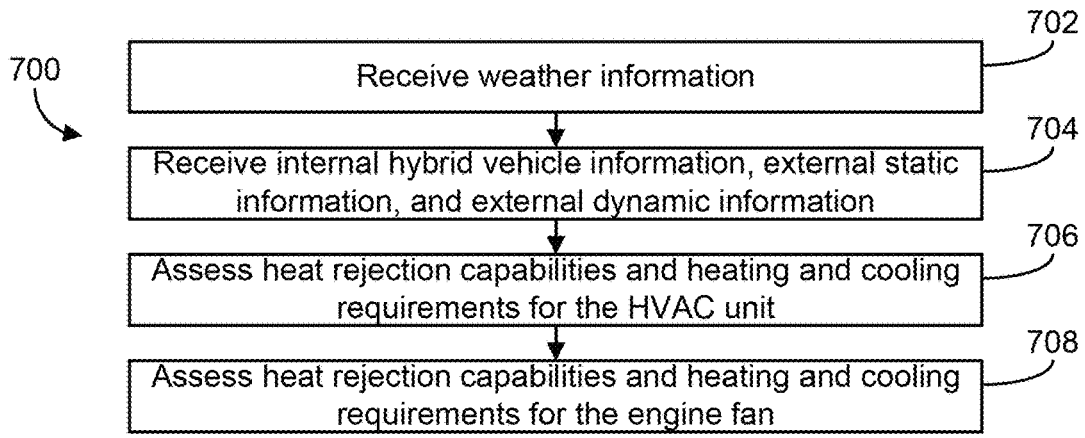
FIG. 7 is a flow diagram of a method of controlling the operation of one or more electronic accessories using weather information, according to an example embodiment.

Referring to FIG. 7, a method 700 of controlling the operation of one or more electronic accessories using weather information is shown, according to an exemplary embodiment. The method 700 includes receiving weather information (block 702). The weather information may generally include the weather conditions along the route the vehicle is traversing. The method 600 further includes receiving internal hybrid vehicle information, external static information, and external dynamic information (block 704).

The method further includes assessing heat rejection capabilities and heating and cooling requirements for the HVAC unit (block 706) and the engine fan (block 708). For example, in cooler weather conditions, less cooling (or more heating) may be required from the HVAC unit (to cool the cabin) and the engine fan (to cool the engine coolant). As another example, in warmer weather conditions, less heating (or more cooling) may be required from the HVAC unit, while the heat rejection capabilities of the various accessories may be reduced.

It should be noted that the processes of the methods described herein may be utilized with the other methods, although described in regard to a particular method. It should further be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors (e.g., coupled to the components and/or systems in FIG. 1) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. While each specific "module" described herein above may have the structure/configuration also defined herein above for each particular module, it should be understood that the definition of the term "module" is intended to be broadly interpreted such that many structural configurations are possible. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

The invention claimed is:

1. A system for a vehicle, the system comprising:
   a vehicle accessory including a thermal management system; and
   a controller coupled to the vehicle accessory, the controller configured to:
      receive internal vehicle information including information about the vehicle accessory;
      receive at least one of (i) external static information based on a position of the vehicle or (ii) external dynamic information based on the position and a time of travel of the vehicle at the position; and
      control operation of the thermal management system based on (i) the internal vehicle information and (ii) the at least one of the external static information or the external dynamic information to pre-heat or pre-cool a portion or a component of the vehicle in advance of or in response to a change along a route of the vehicle.

2. The system of claim 1, wherein the controller is configured to selectively activate or deactivate the vehicle accessory based on at least one of the internal vehicle information, the external static information, or the external dynamic information.

3. The system of claim 1, wherein the external static information includes a road grade, and wherein the controller is configured to selectively control the vehicle accessory based on the road grade.

4. The system of claim 3, wherein the controller is configured to control the thermal management system to selectively pre-heat or pre-cool the portion or the component of the vehicle based on an indication of an upcoming change in the road grade.

5. The system of claim 3, wherein the vehicle accessory includes an air compressor, and wherein the controller is configured to pre-charge the air compressor based on an indication of an upcoming increase in the road grade.

6. The system of claim 1, wherein the vehicle accessory includes an air compressor, and wherein the controller is configured to charge the air compressor by capturing available potential energy as the vehicle travels downhill.

7. The system of claim 1, wherein the external static information includes a speed limit ahead of the vehicle, and wherein the controller is configured to control the thermal management system to selectively pre-heat or pre-cool the portion or the component of the vehicle based on the speed limit ahead of the vehicle indicating a reduced speed ahead of the vehicle by operating the thermal management system using energy harnessed from a slowing of the vehicle to the reduced speed ahead of the vehicle.

8. The system of claim 1, wherein the external static information includes a speed limit ahead of the vehicle, wherein the vehicle accessory includes an air compressor, and wherein the controller is configured to control the air compressor based on the speed limit ahead of the vehicle indicating a reduced speed ahead of the vehicle by charging the air compressor using energy harnessed from a slowing of the vehicle to the reduced speed ahead of the vehicle.

9. The system of claim 1, wherein the external dynamic information includes an upcoming traffic condition, and wherein the controller is configured to control the thermal management system to selectively pre-heat or pre-cool the portion or the component of the vehicle based on the upcoming traffic condition.

10. The system of claim 1, wherein the external dynamic information includes an upcoming traffic condition, wherein the vehicle accessory includes an air compressor, and wherein the controller is configured to pre-charge the air compressor prior to the vehicle encountering the upcoming traffic condition.

11. The system of claim 1, wherein the external dynamic information includes a weather condition, and wherein the controller is configured to utilize the weather condition to assess heat rejection capabilities and heating and cooling requirements for the thermal management system.

12. A system for a vehicle, the system comprising:
    a vehicle accessory including an air compressor configured to compress air for use by a braking system of the vehicle; and
    a controller coupled to the vehicle accessory, the controller configured to:
       acquire internal vehicle information including information about the vehicle accessory;
       acquire at least one of (i) external static information based on a position of the vehicle or (ii) external dynamic information based on the position and a time of travel of the vehicle at the position; and
       control operation of the vehicle accessory based on (i) the internal vehicle information and (ii) the at least one of the external static information or the external dynamic information.

13. The system of claim 12, wherein the controller is configured to acquire the external static information, and wherein the external static information includes a road grade ahead of the vehicle.

14. The system of claim 12, wherein the controller is configured to acquire the external static information, and wherein the external static information includes a speed limit ahead of the vehicle.

15. The system of claim 12, wherein the controller is configured to acquire the external dynamic information, and wherein the external dynamic information includes a traffic condition ahead of the vehicle.

16. The system of claim 12, wherein the controller is configured to acquire the external dynamic information, and wherein the external dynamic information includes a weather condition ahead of the vehicle.

17. The system of claim 12, wherein the vehicle accessory includes a thermal management system configured to facilitate a cooling or a heating of a portion or a component of the vehicle.

18. A method comprising:
- acquiring, by a controller, internal vehicle information including information about one or more vehicle subsystems of a vehicle including an air compressor configured to compress air for use by a braking system of the vehicle and a thermal management system;
- acquiring, by the controller, at least one of (i) external static information based on a position of the vehicle or (ii) external dynamic information based on the position and a time of travel of the vehicle at the position; and
- controlling, by the controller, operation of the one or more vehicle subsystems based on (i) the internal vehicle information and (ii) the at least one of the external static information or the external dynamic information.

19. The method of claim 18, further comprising:
- acquiring, by the controller, the external static information and the external dynamic information; and
- controlling, by the controller, operation of the one or more vehicle subsystems based on the internal vehicle information, the external static information, and the external dynamic information.

\* \* \* \* \*